US 6,569,331 B2

(12) United States Patent
Raeyes

(10) Patent No.: US 6,569,331 B2
(45) Date of Patent: May 27, 2003

(54) METHOD FOR ANIMAL EXCRETA PROCESSING

(76) Inventor: Rodney Raeyes, 1044 San Antonio Ave., Ontario, CA (US) 91762-1844

( * ) Notice: Subject to any disclaimer, the term of this patent is extended or adjusted under 35 U.S.C. 154(b) by 78 days.

(21) Appl. No.: 09/942,127

(22) Filed: Aug. 30, 2001

(65) Prior Publication Data
US 2003/0042198 A1 Mar. 6, 2003

(51) Int. Cl.[7] .............................. C02F 3/00; C05F 3/00; F26B 3/02; F26B 5/04
(52) U.S. Cl. ..................... 210/603; 210/631; 210/916; 71/21; 34/390; 34/406; 34/423; 422/5
(58) Field of Search .................. 210/603, 612, 210/916, 631; 71/15, 21; 34/390, 406, 423, 424; 422/5; 426/807

(56) References Cited

U.S. PATENT DOCUMENTS

| 3,233,976 A | * | 2/1966 | Varro, Jr. et al. ............ 422/195 |
| 4,245,396 A | * | 1/1981 | Maffet ........................ 34/386 |
| 5,275,943 A | * | 1/1994 | DiTuro ....................... 435/179 |
| 5,496,730 A | * | 3/1996 | Teramachi ............... 435/290.2 |
| 5,543,309 A | * | 8/1996 | Pischel ....................... 435/177 |
| 5,700,687 A | * | 12/1997 | Finn ............................ 435/266 |
| 5,702,499 A | * | 12/1997 | Timmenga ....................... 71/9 |
| 5,913,588 A | * | 6/1999 | Legros et al. ................. 34/347 |
| 5,951,947 A | * | 9/1999 | Hunt ............................ 422/21 |
| 2002/0114866 A1 | * | 8/2002 | Kartchner .................... 426/55 |

FOREIGN PATENT DOCUMENTS

| DE | CH-570344 | * | 12/1975 |
| JP | 6-193850 | * | 7/1994 |
| JP | 2001-19581 | * | 1/2001 |

* cited by examiner

Primary Examiner—Fred Prince
(74) Attorney, Agent, or Firm—Dennis W. Beech

(57) ABSTRACT

The method and apparatus for processing of animal excreta or manure for further use or environmentally friendly disposal introduces a new first stage and ancillary elements for improved processing of manure material. The improvement involves an initial process to rapidly sterilize the material to remove undesirable microorganisms prior to further processing. This new first stage processing results in a refined end product for further use or environmentally friendly disposal. Additionally, ancillary equipment for digesting the initial material input to extract methane gas for use as a fuel in the process is included. Further, a thermal oxidizer to treat extracted gasses created in the new first stage process is used to reduce pathogens, other pollutants and toxic gasses prior to passing the gas to the environment.

6 Claims, 3 Drawing Sheets

METHOD FOR ANIMAL EXCRETA PROCESSING

BACKGROUND OF THE INVENTION

This invention relates to processing of organic waste for subsequent use or disposal to minimize environmental impact. More specifically the method processes animal excreta, particularly farm and other animals, for subsequent use as for example as a fuel or as organic fertilizer, soil enhancer and soil amendment.

There are current systems for processing animal excreta or manure that use a hydrolyzed vacuum drying process that uses steam heat for indirect heating of the manure that results in rapid sterilization and drying. The technology can process animal manure into a minimum content pathogenic, odorless product in an approximately two hour cycle continuous operation process.

The current art processing system includes an animal manure input and initial processing structure. Any initial leached water and gas odor is removed at this stage. The manure is then processed through a vacuum fermentation and drying machine. Inside the machine the manure is sanitized, crushed and dried while being continuously conveyed through the machine by a disk type conveyor.

The conveyor shaft and disks are hollow to allow steam vapor to be passed therethrough for heating the conveyed manure by indirect heat conduction. The manure is passed through the conveyor chamber in a low vacuum environment to aid fermentation and the removal of gases and condensed liquids. The gases and liquid are transported to a deodorizing facility. Use of indirect heating minimizing burning of material and adhesion of material to the conveyor chamber walls.

Use of the vacuum fermentation and drying machine as the initial drying stage for the material, manure, has been found to provide only tolerable levels of sterilization for the final output product of the process. A means to further sterilize the material requires implementation to achieve the desired purity of the end product.

In a typical existing processing plant the material is conveyed from the vacuum fermentation and drying machine to a continuous drying, cooling and screening machine. As the material is conveyed through a rotary drum, gas and vapor are removed by a negative pressure differential in the drum. This provides additional drying of the material. The extracted gas and vapor is transported for further processing. As part of the gas/vapor removal the conveyed material is cooled. The material is then passed through a screen or filter to remove any waste or debris. The finished product is then deposited in a storage element or hopper.

Ancillary elements are used with such manure treatment facilities, for example, bio-tanks to remove odor from waste produced during the process and effluent treatment plants for processing liquid waste removed during the process. The art of these elements is well known and not directly relevant to the improvement of the instant invention. Also, water boilers, cooling towers, and power and control elements are part of any such manure processing facility.

As can be seen there is a need for better sterilization of animal manure processed for reuse to promote better environmentally friendly manure products.

SUMMARY OF THE INVENTION

One object of the present invention is improved sterilization of processed animal manure for reuse thereof. Another object is integration of apparatus for sterilization into existing continuous process manure product facilities.

These and other features, aspects and advantages of the present invention will become better understood with reference to the following drawings, description and claims.

DESCRIPTION OF THE PREFERRED EMBODIMENT

The following detailed description is the best currently contemplated modes for carrying out the invention. The description is not to be taken in a limiting sense, but is made merely for the purpose of illustrating the general principles of the invention.

Figure 1:
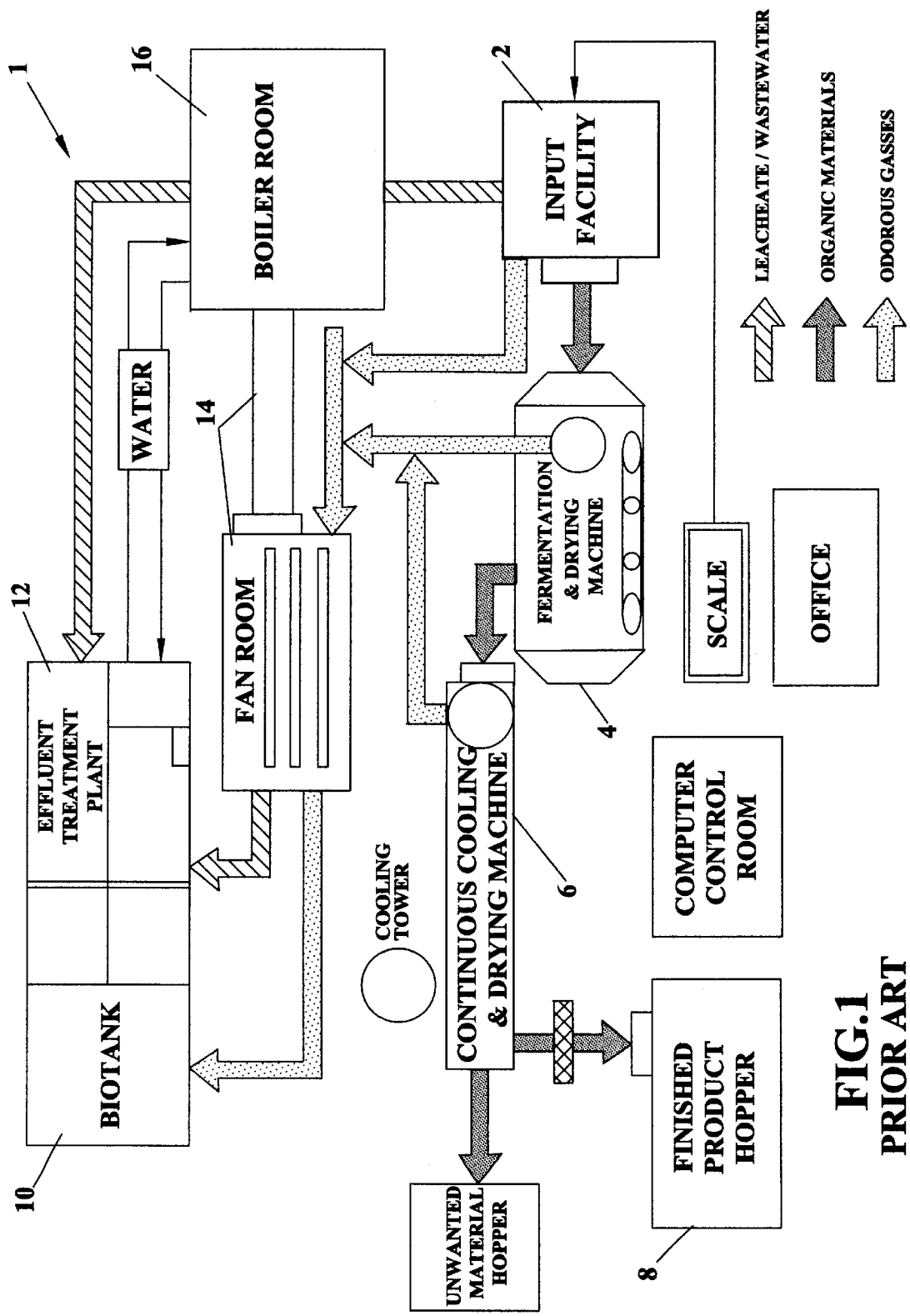
FIG. 1 illustrates a prior art animal manure processing plant.

Referring to FIG. 1, a prior art animal manure processing plant 1 has an input facility 2 in communication with a vacuum fermentation and drying machine 4. After fermentation and drying the manure material is processed through a continuous drying, cooling and screening machine 6 for output to a finished product facility 8. As the animal manure is conveyed through the plant equipment various gasses, liquid wastes and solid wastes are produced. These by-products are processed in a bio-tank 10 and an effluent treatment plant 12. The waste products are extracted by condensing/cooling 14, low pressure gas removal, and filtering or screening. A boiler facility 16 produces steam for heating during the initial drying process.

Figure 2:
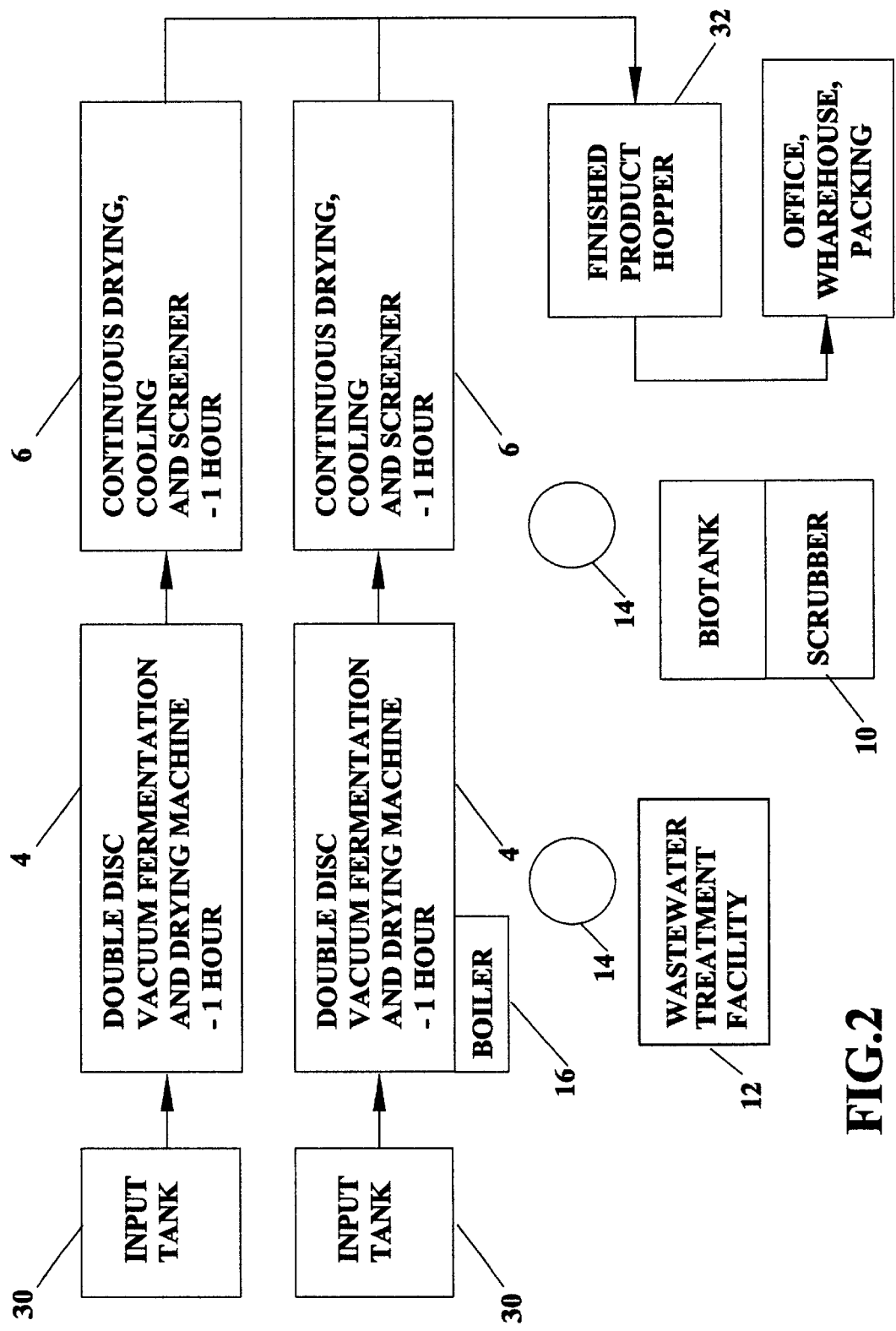
FIG. 2 illustrates a flow chart of a prior art animal manure process.

Referring to FIG. 2, the process flow in an existing animal manure plant 1 may be characterized with material input at an input tank 30, conveying the material through a double disk vacuum fermentation and drying machine 4 for approximately one hour, conveying the material through a continuous drying, cooling and screening machine 6 for approximately one hour, and then outputting the manure material finished product into a hopper 32 for packaging 34. The ancillary support elements to support the material processing include a boiler 16, condenser/cooler 14, a wastewater treatment facility 12, and a bio-tank/scrubber 10.

Figure 3:
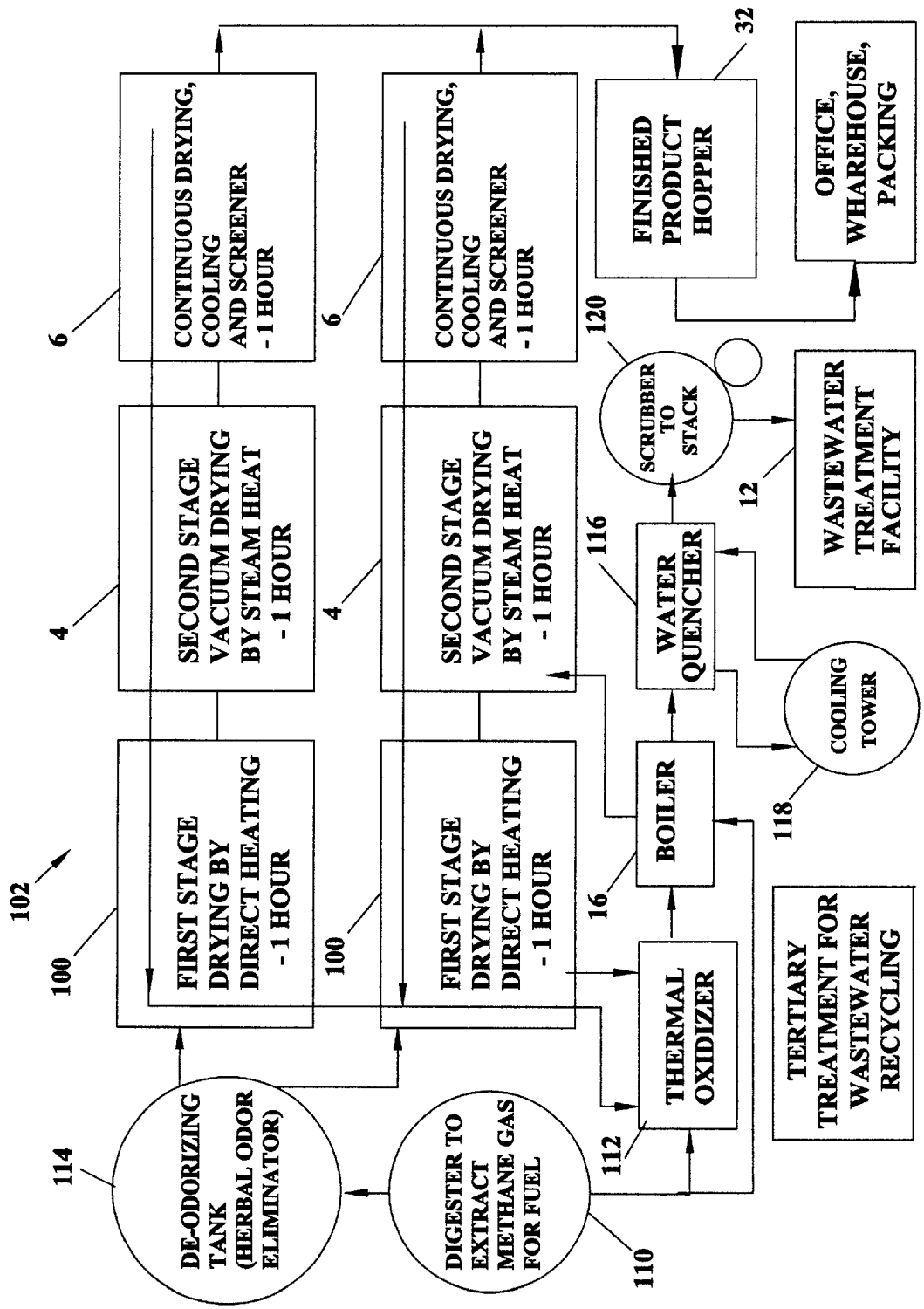
FIG. 3 illustrates a flow chart of an animal manure process according to the invention.

Referring to FIG. 3, an improved process flow for animal manure treatment introduces a direct drying heating machine 100 as the first treatment element. In this method animal manure material is initially deposited in a digester tank 110 to extract any methane and other trace gasses. The extracted methane gas may be used to supplement the fuel necessary to power the boiler 16 and thermal oxidizer 112.

The material is then conveyed to a deodorizing tank 114 to neutralize gaseous odors by means of herbal odor elimination treatment. Inside the tank 114 misters or nozzles spray the material with a herbal solution that may be for example one part concentrated herbal liquid per 100 parts of water. The herbal odor eliminator is a formulated organic enzyme to eliminate odor and accelerate fermentation.

From the deodorizing tank 114 the material is conveyed to the direct drying and heating machine 100 for rapid sterilization by direct heating at approximately 275° F. for approximately one hour. The direct drying and heating machine 100 heat is introduced by burners in the upper portion of the heating enclosure. As the material passes through the machine 100 the 275° F. temperature vaporizes the volatile organic compound or gases. These vapors are then extracted from the machine and transported to the thermal oxidizer 112. This initial or first stage 102 sterilization and associated drying produces a material at this initial stage that is relatively free of undesirable microorganisms.

The material is next conveyed to a vacuum fermentation and drying machine 4 as a second stage in the processing. The material is thereafter processed to provide a finished product at hopper 32 as previously described in the prior art.

The thermal oxidizer 112 added to support the direct drying heating machine 100 receives the hot gasses including air removed from the first stage 102 by a negative pressure differential in machine 100. The thermal oxidizer 112 is operated at a temperature of 1400° F. to destroy and eliminate to the extent possible pathogens, other pollutants and toxic gasses produced as a by-product of the first stage 102. Heat from the thermal oxidizer 112 may also be routed to the boiler 16 to reduce fuel consumption.

The hot air product of the boiler 16 may be passed through the water quencher 116 for cooling. The water used in the water quencher 116 is recirculated through the cooling tower 118. A scrubber 120 may be used to further cool the air and remove particulate or pollutant before the flue gas exits. Water used in the scrubber 120 may be processed in the wastewater or effluent treatment plant 12.

While the invention has been particularly shown and described with respect to the illustrated and preferred embodiments thereof, it will be understood by those skilled in the art that the foregoing and other changes in form and details may be made therein without departing from the spirit and scope of the invention.

I claim:

1. An improvement to methods for processing animal excreta which methods include the steps of inputting animal excreta material, vacuum fermenting and drying the material, continuously drying, cooling and screening of the material, and outputting processed material, the improvement comprising the steps of:

inputing animal excreta material;

placing the material in a digester after the inputting thereof and extracting methane gas therefrom;

deodorizing the material;

transferring the material to a direct drying heating machine;

heating the material for sterilization thereof; and transferring the material to a vacuum fermenting and drying machine for further processing.

2. The improvement as in claim 1 further comprising the step of:

transferring the extracted methane gas to a thermal oxidizer and a boiler for use as fuel.

3. The improvement as in claim 1 wherein an herbal odor eliminator is used to deodorize the material.

4. The improvement as in claim 1 wherein the material is directly heated to a temperature of approximately 275° F. for approximately one hour for sterilization.

5. The improvement as in claim 1 further comprising the steps of:

removing hot gasses during the heating of the material for sterilization;

transferring the removed hot gasses to a thermal oxidizer; and operating the thermal oxidizer at a temperature of approximately 1400° F.

6. The improvement as in claim 5 further comprising the step of:

transferring remaining heat by-product of operating the thermal oxidizer to a boiler for heating thereof.

* * * * *